Nov. 29, 1949     E. HRABAL     2,489,709
AUTOMATIC LOAD RELEASE MECHANISM FOR PARACHUTES
Filed April 14, 1948     2 Sheets-Sheet 2
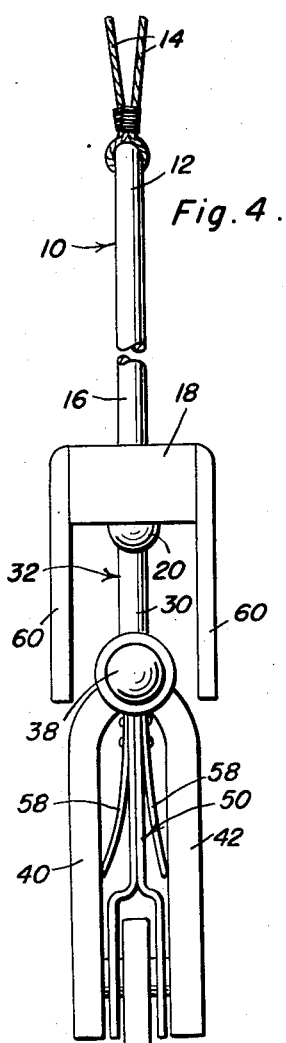
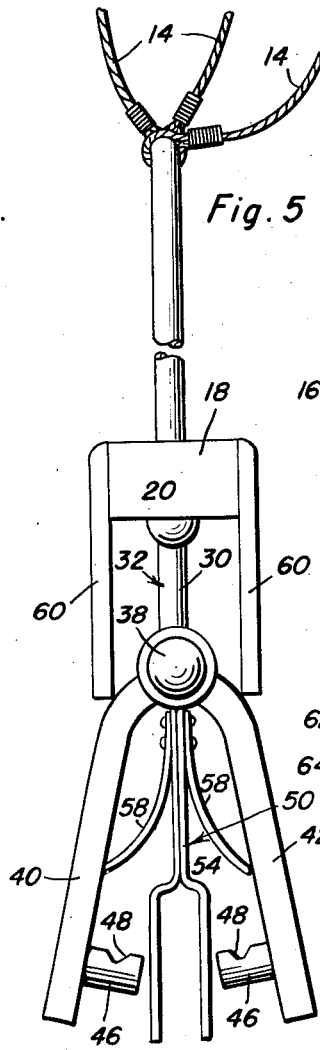
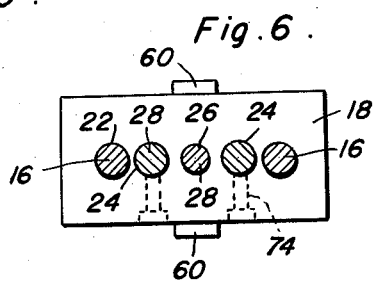
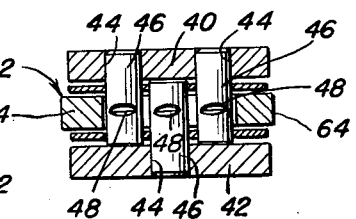
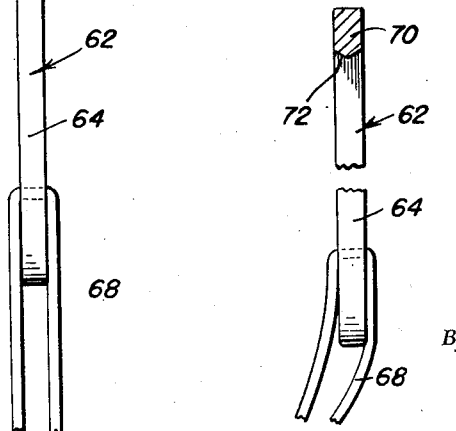
Inventor
Eduard Hrabal
By Clarence A. O'Brien
and Harvey B. Jacobson
Attorneys Patented Nov. 29, 1949

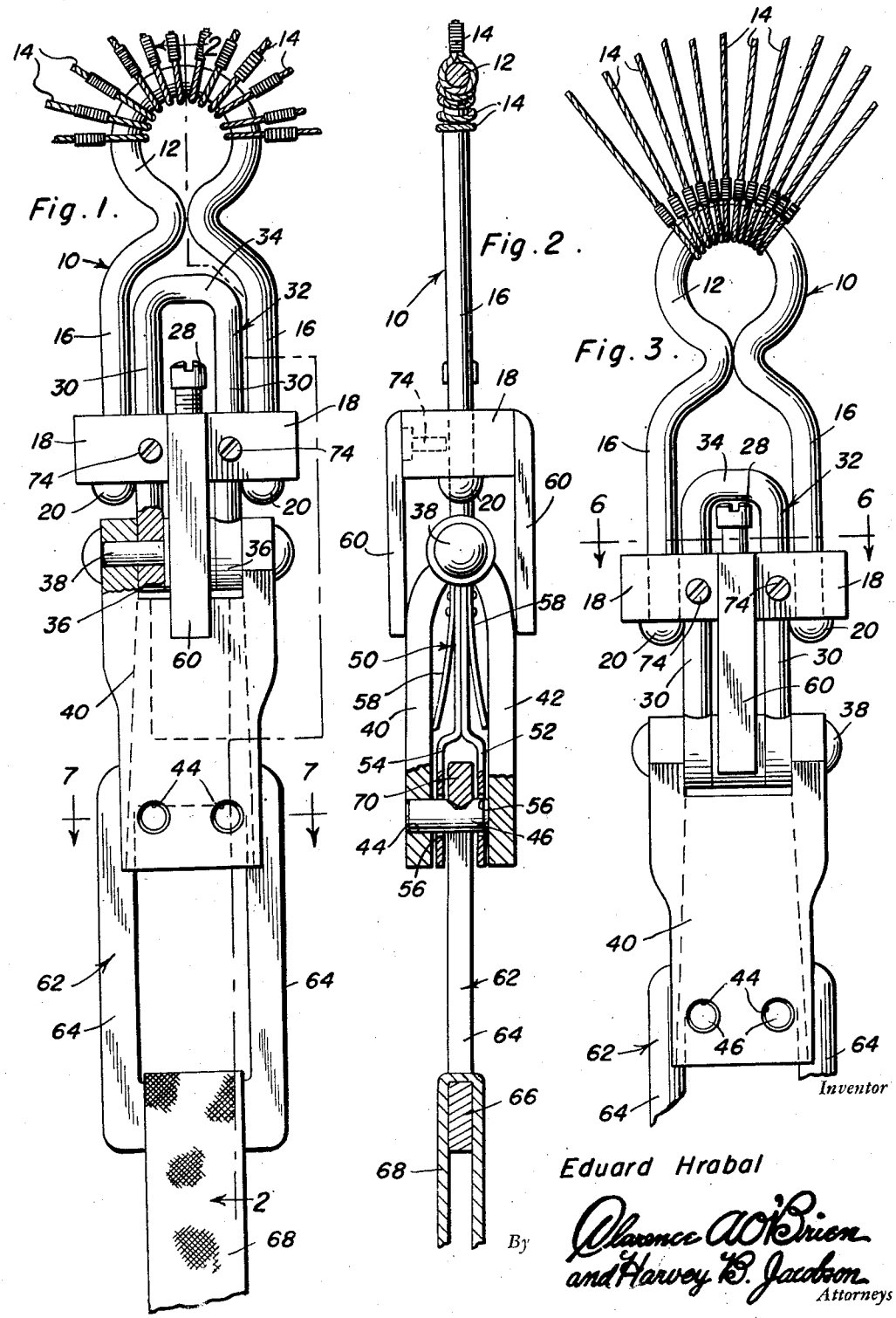

2,489,709

UNITED STATES PATENT OFFICE 2,489,709

AUTOMATIC LOAD RELEASE MECHANISM FOR PARACHUTES

Eduard Hrabal, Washington, D. C., assignor of thirty-five per cent to Rafael Dominguez, Washington, D. C.

Application April 14, 1948, Serial No. 20,955

2 Claims. (Cl. 294—83)

This invention relates to automatic load release mechanism for a parachute, and has for its primary object automatically to disconnect the harness from the parachute upon the engagement of the load with a supporting surface.

Another object is to automatically free the wearer of a parachute harness from the parachute upon the termination of the jump.

Quick release means for parachute harness have found utility in military operations and the like where it becomes important for the chutist quickly to divest himself of the harness which is usually permanently connected to the parachute. So far as I am aware, such release of the parachute harness has required manual manipulation of the harness hooks and the like by the chutist after he has completed his jump, but so far as I am aware no automatic release means which disconnects the harness from the parachute has as yet become known.

It is therefore another object of this invention to automatically release the parachute from the harness when the load is removed from the harness, as by the landing of the chutist on the surface of the earth.

A further object is to avoid injury to the load after it has contacted the ground, as by being dragged by the parachute along the surface of the earth.

The above and other objects may be attained by employing this invention which embodies among its features notched interdigitating studs suspended from the shrouds of a parachute, means yieldingly to urge said studs out of interdigitating relation, and a load suspending link engaging the walls of the notches in the studs to hold the studs in interdigitating relation while a load is suspended on the link.

Other features include releasable means to hold the studs in interdigitating relation against the effort of the yielding means, and means automatically to move the releasable means to released position when the load is imposed upon the parachute.

Still other features include a pair of jaw members pivoted together at adjacent ends and having their pivoted ends suspended by the shroud lines of a parachute, notched interdigitating studs carried by the jaw members near the ends remote from the pivoted ends thereof, means yieldingly engaging the jaw members to urge the studs out of interdigitating relation and a load-suspending link engaging the walls of the notches in the studs to hold the studs in interdigitating relation while a load is suspended on the link.

In the drawings,

Figure 1 is a side view of an automatic load release mechanism embodying the features of this invention showing the relation of the parts before a load is suspended thereon;

Figure 2 is a sectional view of the device taken substantially on the line 2—2 of Figure 1;

Figure 3 is a view similar to Figure 1 illustrating the position of the parts when a load is suspended thereon;

Figure 4 is an edge view of the device as illustrated in Figure 3;

Figure 5 is a view similar to Figure 4 illustrating the position of the parts when the parachute is being discharged from the load;

Figure 6 is a horizontal sectional view taken substantially along the line 6—6 of Figure 3; and Figure 7 is a horizontal sectional view taken substantially along the line 7—7 of Figure 1.

Referring to the drawings in detail, a parachute shroud line coupling designated generally 10 comprises an eye 12 to which the shroud lines 14 of a conventional parachute are connected in any conventional manner. Extending from the eye 12 are spaced parallel arms 16 carrying a cross-head 18, and the ends of the arms 16 are headed over at their ends remote from the eye 12, as at 20, to form stops against which the cross-head 18 rests. As illustrated in Figure 6, the cross-head is provided adjacent opposite ends with spaced parallel openings 22 for the reception of the arms 16, and formed inwardly of the openings 22 are spaced parallel openings 24 for the reception of the suspension yoke, to be more fully hereinafter described. Formed midway between opposite ends of the cross-head 18 is an internally screw-threaded opening 26 for the reception of the threaded shank of an adjusting screw 28, the purpose of which will be more fully hereinafter described.

Extending through the openings 24 of the cross-head 18 are spaced parallel legs 30 of an inverted U-shaped suspension yoke designated generally 32, the bight portion 34 of which straddles the screw 28, as will readily be understood upon reference to the drawings. Formed at the ends of the legs 30 of the yoke 32 remote from the bight portion 34 are eyes 36 having aligning openings for the reception of a pivot pin 38.

Pivotally suspended on the pivot pin 38 are jaw members 40 and 42 which project in a direction opposite the yoke 32 and are pierced at their ends remote from the pivot 38 with openings 44. As illustrated in Figure 7, the jaw member 40 is provided with two openings 44, while the jaw member 42 is provided with a single opening 44, the axes of said openings lying in the same horizontal plane when the jaw members are in closed position and in spaced parallel relation to one another. Driven into the openings 44 are studs 46 having notches 48 in their upper sides in which the upper end of the load suspending link seats during the descent of the loaded parachute.

Suspended from the eyes 36 at the lower ends of the arms 30 of the yoke 32 is a link guard designated generally 50, the lower end of which is bifurcated as at 52 to form a space 54 for the reception of the load suspending link. Formed in the bifurcated portion 52 adjacent its lower end are transversely extending openings 56 which, when the jaws 40 and 42 are closed, receive the studs 46. Attached to the link guard 50 adjacent the upper end thereof are leaf springs 58 which bow outwardly to engage the inner faces of the jaw members 40 and 42 yieldingly to urge them outwardly as illustrated in Figure 5. Carried by the cross-head 18 on opposite sides thereof are depending fingers 60 which, as illustrated is Figure 2, are adapted to engage the outer faces of the jaw members 40 and 42 to hold them closed against the effort of the springs 58 when the cross-head is in lowered position on the suspension yoke 32, as illustrated in Figures 1 and 2.

In order to support a load on the mechanism above described, I provide a load suspension link 62 comprising spaced parallel side bars 64 which are joined at their lower ends by a cross bar 66 to which a load suspending strap 68 may be attached. The upper ends of the side bars 64 are joined by a cross bar 70, the inner edge of which is V-shaped, as at 72, for cooperation with the notches 48 in holding the jaws closed when a load is suspended on the device. As illustrated, when the jaw members are closed, the studs 46 are in interdigitating relation to one another so that the notches 48 lie in alignment and in a position to receive the V-shaped edge 72 of the link 70.

In use, the eye 12 of the shroud line coupling 10 is connected to the shroud lines 14, and the load is coupled to the load suspending strap 68. The cross-head 18 is moved into elevated position, as illustrated in Figures 4 and 5, and the link 62 is entered into position in the space 54 of the link guard 50. The jaws are then moved to closed position by advancing the cross-head 18 toward the pivot 38, thus causing the fingers 60 to engage the jaws as illustrated in Figure 2 and hold them closed with the studs 46 in interdigitating relation and the notches 48 in alignment. In this position, the link 62 may be moved toward the free ends of the jaws 40 and 42 to cause the V-shaped edge 72 to engage the walls of the notches 48. As soon as the shroud lines 14 are placed under tension, it will be obvious that the cross-head 18 will slide upwardly on the suspension yoke 32 until the head of the screw 28 engages the bight portion 34 thereof. Upward movement of the cross-head causes the fingers 60 to move upwardly as illustrated in Figure 4, and owing to the tension on the link 62, the V-shaped edge 72 of the link will hold the studs in interdigitating relation against the effort of the springs 58. The link guard 50 will prevent the link from rocking on its V-shaped edge in the notches 48 and forcing the jaws 40 and 42 apart, and hence so long as the load is suspended on the link 62, the fingers will remain in interdigitating relation and the load will be suspended by the parachute. As soon as the load encounters a supporting surface, however, the tension on the link 62 will be released, thus allowing the V-shaped edge 72 to disengage the walls of the notches 48 and thus permitting the springs 58 to move the jaw members 40 and 42 outwardly as illustrated in Figure 5, thus withdrawing the studs 46 from link supporting position and freeing the load from the chute. In this way, it is obvious that the load will be freed as soon as it contacts the ground without requiring manual manipulation. In order to hold the fingers 60 in jaw-closing position, as, for instance, during the coupling of the device to a parachute and load, I form in the cross-head 18 internally screw-threaded openings for the reception of set screws 74, the inner ends of which are adapted to impinge against the legs 30 of the yoke 32, releasably to hold the yoke 18 against sliding movement thereon.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. Automatic load release mechanism for a parachute comprising a pair of jaw members pivoted together at adjacent ends, a suspension yoke at the pivoted ends of the jaw members, a cross-head mounted on the yoke to slide toward and away from the jaw members, shroud coupling means carried by the cross-head, a jaw engaging finger on each side of the cross-head for movement therewith toward and away from the jaw members, interdigitating notched studs carried by the jaw members remote from their pivoted ends, means between the jaw members yieldingly to urge the jaw members apart and the studs out of the interdigitating relation and a load supporting link engaging the walls of the notches in the studs releasably to hold the studs in interdigitating relation while a load is supported on the link.

2. Automatic load release mechanism for a parachute comprising a pair of jaw members pivoted together at adjacent ends, a suspension yoke at the pivoted ends of the jaw members, a cross-head mounted on the yoke to slide toward and away from the jaw members, shroud coupling means carried by the cross-head, a jaw engaging finger on each side of the cross-head for movement therewith toward and away from the jaw members, interdigitating notched studs carried by the jaw members remote from their pivoted ends, means between the jaw members yieldingly to urge the jaw members apart and the studs out of interdigitating relation, a load supporting link engaging the walls of the notches in the studs releasably to hold the studs in interdigitating relation while a load is supported on the link, and a link guide between the jaw members.

EDUARD HRABAL.

REFERENCES CITED

The following references are of record in the file of this patent:

UNITED STATES PATENTS

| Number | Name | Date |
| --- | --- | --- |
| 2,400,165 | Porter | May 14, 1946 |